(12) United States Patent
Wolf et al.

(10) Patent No.: US 9,577,354 B2
(45) Date of Patent: Feb. 21, 2017

(54) ELECTRICAL TRANSMISSION LINE REPAIR DEVICE

(71) Applicants: Randy L. Wolf, Trussville, AL (US); Carl Russel Tamm, Trussville, AL (US)

(72) Inventors: Randy L. Wolf, Trussville, AL (US); Carl Russel Tamm, Trussville, AL (US)

(73) Assignee: Classic Connectors, INC., Trussville, AL (US)

( * ) Notice: Subject to any disclaimer, the term of this patent is extended or adjusted under 35 U.S.C. 154(b) by 123 days.

(21) Appl. No.: 14/514,318

(22) Filed: Oct. 14, 2014

(65) Prior Publication Data

US 2016/0104954 A1    Apr. 14, 2016

(51) Int. Cl.
| | |
|---|---|
| *H01R 4/44* | (2006.01) |
| *H01R 43/00* | (2006.01) |
| *H01R 4/36* | (2006.01) |
| *H01R 13/53* | (2006.01) |
| *H02G 1/02* | (2006.01) |
| *H01R 11/07* | (2006.01) |
| *H01R 4/62* | (2006.01) |

(52) U.S. Cl.
CPC .............. *H01R 4/366* (2013.01); *H01R 13/53* (2013.01); *H01R 43/002* (2013.01); *H02G 1/02* (2013.01); *H01R 4/62* (2013.01)

(58) Field of Classification Search
CPC ............. H01R 43/00; H01R 4/44; H01R 4/46; H01R 4/62; H01R 11/07; H01R 4/2408; H01R 13/5812; H02G 1/02; Y10T 29/49194

USPC ........ 439/797; 29/868; 174/84 R, 94 R, 94 S
See application file for complete search history.

(56) References Cited

U.S. PATENT DOCUMENTS

| | | | | | |
|---|---|---|---|---|---|
| 3,287,491 | A | * | 11/1966 | Hubbard ................... | H01R 4/40 174/138 R |
| 4,795,365 | A | * | 1/1989 | Johnston .............. | H01R 4/2491 439/411 |
| 5,581,051 | A | * | 12/1996 | Hill ........................ | H01H 31/00 174/138 R |
| 7,794,291 | B2 | * | 9/2010 | Goch ....................... | H01R 4/44 29/868 |

FOREIGN PATENT DOCUMENTS

CN        201466576 U     5/2010

* cited by examiner

*Primary Examiner* — Amy Cohen Johnson
*Assistant Examiner* — Matthew T Dzierzynski
(74) *Attorney, Agent, or Firm* — The Watson I.P. Group, PLC; Jovan N. Jovanovic; Vladas M. Vasiljevic

(57) ABSTRACT

An electrical transmission line repair device including a first conductor clamp, a second conductor clamp and at least one tie rail extending between the first and second conductor clamps in a spaced apart orientation. The first conductor clamp including a lower assembly and an upper assembly. The lower assembly and the upper assembly are slidably engageable with each other so as to define a conductor cavity extending therealong. Clamping fasteners are configured to extend through openings in the upper assembly so as to be threadable toward and away from the conductor contact region of the lower assembly within the conductor cavity.

18 Claims, 17 Drawing Sheets

ELECTRICAL TRANSMISSION LINE REPAIR DEVICE

CROSS-REFERENCE TO RELATED APPLICATION

N/A

BACKGROUND OF THE DISCLOSURE

1. Field of the Disclosure

The disclosure relates in general to electrical transmission line repair systems, and more particularly, to an electrical transmission line repair device that is configured provide mechanical and/or electrical integrity to electrical conductors as well as connectors, clamps, suspensions and the like. It will be understood that while transmission line is referred to herein, such shall encompass many types of electrical lines, including those that are often referred to as transmission and/or distribution lines and the like.

2. Background Art

Electrical transmission lines are well known in the art and include commonly known overhead types. Such types of electrical transmission lines comprise a core formed from metal members, as well as composite members having an outer conductive cladding extending around the core, typically made from an aluminum or aluminum alloy (although other conductors are likewise contemplated). A number of different configurations of such transmission lines as well as connectors, suspensions and clamps are disclosed in U.S. Pat. No. 7,794,291 issued to Goch, entitled "Electrical Transmission Line Repair Service," the entire specification of which is hereby incorporated by reference.

While the solutions proposed in the prior art have greatly facilitated the restoration of mechanical and/or electrical integrity to such systems, there is a constant need for improvement. One area of improvement pertains to preparation and installation on a jobsite. As will be appreciated, the installation of these devices is often done on energized lines that are suspended above the ground, often at great heights. Thus, the installation environment is quite rugged and difficult. Thus, there is a persistent need to allow for easier preparation of the devices and the adjoining lines, as well as easier assembly. In addition, there is a need to minimize the componentry so as to limit both the weight and the structure of the device that must be handled by users in such rugged environments. Furthermore, there is a need to improve and increase the robustness of the clamps and structures that clamp the device to the conductor.

SUMMARY OF THE DISCLOSURE

The disclosure is directed to an electrical transmission line repair device. The device comprises a first conductor clamp and a second conductor clamp spaced apart from the first conductor clamp. At least one of the first conductor clamp and the second conductor clamp further including a lower assembly, an upper assembly and at least one clamping fastener. The lower assembly includes a conductor contact region extending longitudinally therealong with a first side connector assembly extending along a first side of the conductor contact region and a second side connector assembly extending along the a second side of the conductor contact region so as to position the conductor contact region therebetween. The upper assembly includes a base wall with a first lower leg extending along a first side of the base wall and a second lower leg extending along a second side of the base wall spaced apart from the first lower leg to define a lower channel therebetween. The first side connector is configured to slidably engage with the first lower leg. The second side connector is configured to slidably engage the second lower leg. As a result, the lower assembly is slidably coupled with the upper assembly to define a conductor cavity therealong. At least one fastener is positionable between the base wall and the conductor contact region of the lower assembly, the fastener configured to be directable toward and away from the conductor contact region of the lower assembly, to, in turn, sandwich a conductor therebetween. At least one tie rail connected to the first conductor clamp and to the second conductor clamp.

In some configurations, the at least one tie rail comprises a first tie rail and a second tie rail. The first tie rail extends between the first conductor clamp and the second conductor clamp on a first side. The second tie rail extends between the first conductor clamp and the second conductor clamp on a second side opposite the first side of the conductor clamps.

In some configurations, the upper assembly and the lower assembly are substantially symmetrical about a longitudinal axis bisecting the conductor contact region.

In some configurations, the at least one fastener further comprises at least one clamping fastener configured to extend through at least one opening extending through the base wall, and into the lower channel, the at least one fastener including a conductor engagement end.

In some configurations, the upper assembly further comprises a plurality of spaced apart openings extending through the base wall. A clamping fastener is positioned in at least a plurality of the plurality of openings. Each of the plurality of fasteners are directed toward and away from the conductor contact region in a manner that is generally perpendicular to a longitudinal axis of the conductor contact region.

In some configurations, the first side connector assembly further comprises a first side groove. The second side connector assembly further comprises a second side groove. The first lower leg of the upper assembly further includes a first side tongue. The second lower leg of the upper assembly further includes a second side tongue. The first side groove interfaces with the first side tongue and the second side groove interfaces with the second side tongue.

In some configurations, the first side groove and the first side tongue are symmetrical with the second side groove and the second side tongue.

In some configurations, the conductor engagement end is structurally configured to be positionable fully within the lower channel.

In some configurations, the upper assembly includes a first upper wall that extends in a direction away from the base wall on a side of the first lower leg. A second upper wall extends in a direction away from the base wall on a side of the second lower leg. The first and second upper walls are spaced apart with the at least one opening extending therebetween. The first and second upper walls define an upper channel therebetween extending therealong.

In some configurations, the clamping fastener, upon clamping of a conductor therebetween, is structurally configured to remain within the upper channel.

In some configurations, the upper assembly further includes a first side corona shield defining an outwardly convex configuration having an upper end meeting the first upper wall and a lower end mating with the first lower leg. A second side corona shield defines an outwardly convex configuration having an upper end meeting the second upper wall and a lower end mating with the second lower leg.

In some configurations, the outwardly convex configuration of the first and the second side corona shields comprises a semi-circular configuration.

In some configurations, the first and second side corona shields are integrally formed with the upper assembly.

In some configurations the device further includes a first end cap extending from a first end of a central body of the upper assembly and a second end cap extending from a second end of the central body of the upper assembly.

In some configurations, the first and second end caps are substantially hemispherical.

In some configurations, the lower assembly includes a body formed from an extrusion.

In some configurations, the upper assembly includes a body formed from an extrusion.

In some configurations, the second conductor clamp is substantially identical to the first conductor clamp.

BRIEF DESCRIPTION OF THE DRAWINGS

The disclosure will now be described with reference to the drawings wherein.

DETAILED DESCRIPTION OF THE DISCLOSURE

Figure 1:
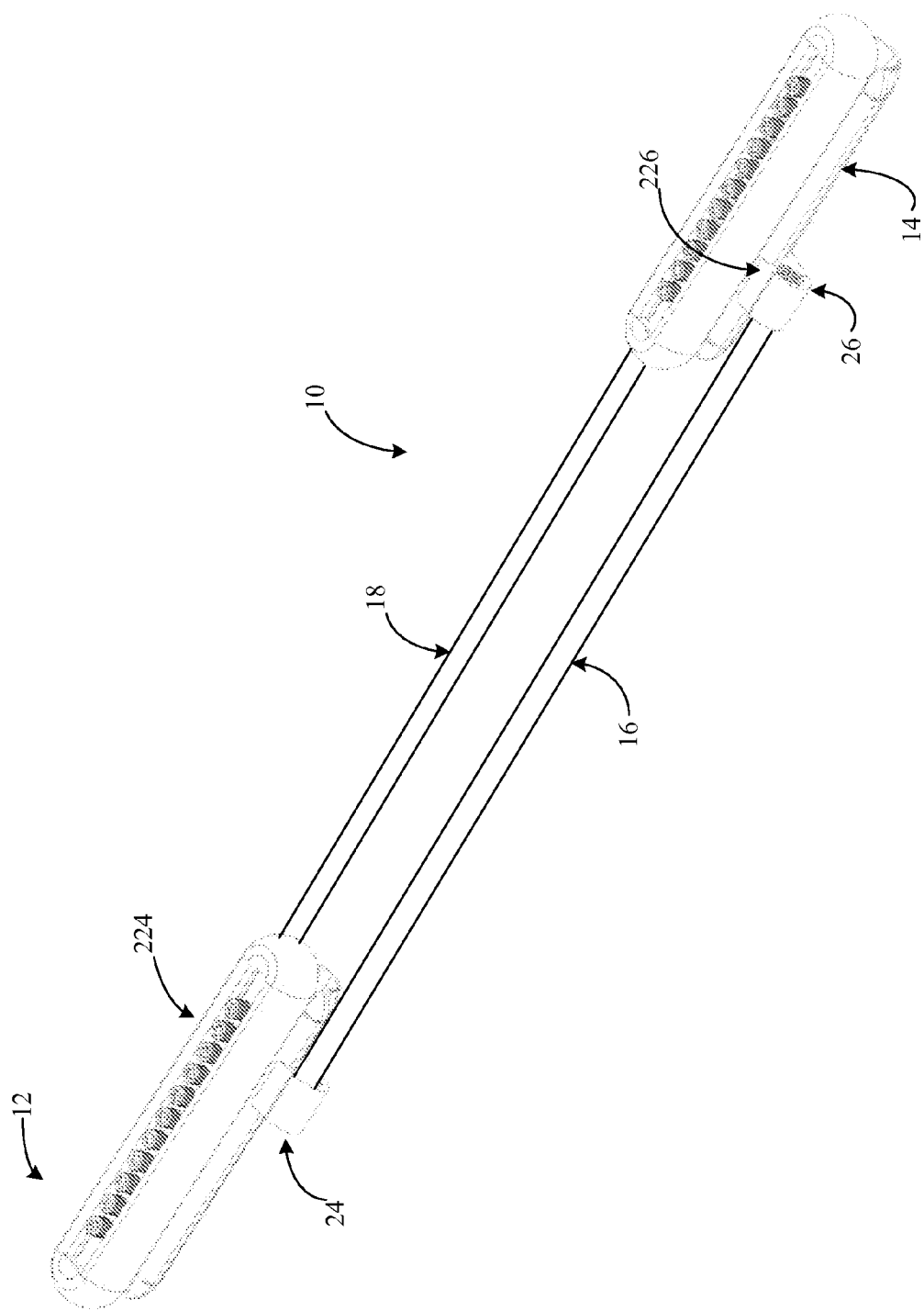
FIG. 1 of the drawings is a perspective view of the electrical transmission line repair device, showing, in particular, the first and second conductor clamps, and the first and second tie rails.
Figure 2:
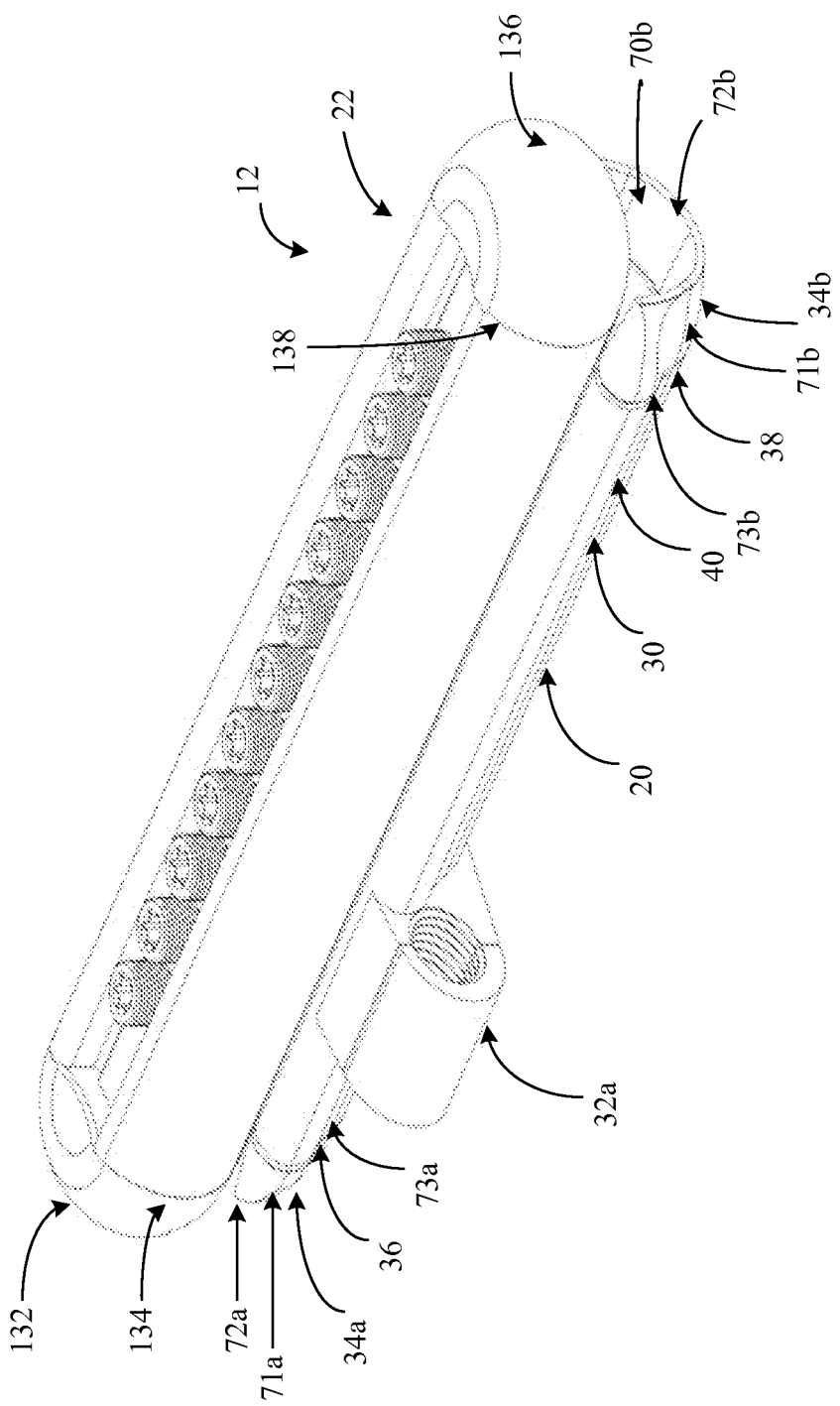
FIG. 2 of the drawings is a perspective view of the first conductor clamp of the present disclosure, showing the first side tie rail connection.
Figure 3:
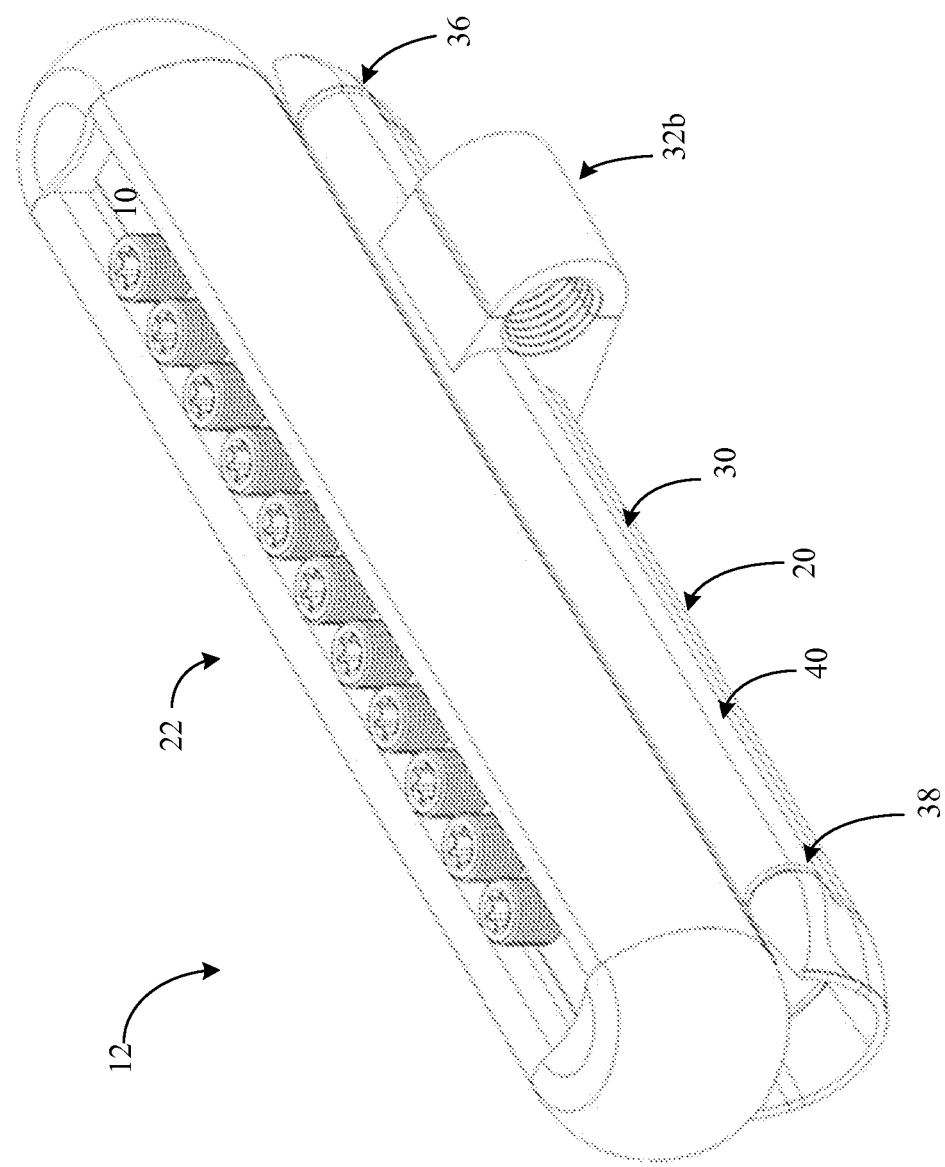
FIG. 3 of the drawings is a perspective view of the first conductor clamp of the present disclosure, showing the second side tie rail connection.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the electrical transmission line repair device of the present disclosure is shown generally at 10. The electrical transmission line repair device is typically well suited for use in distribution and in transmission electrical conductors. That is, conductors that are up to 69,000V and for voltages above 69,000V to 765,000V. Of course, the disclosure is not limited to use therewith, and other configurations are likewise contemplated for use in environments other than those mentioned herein.

The electrical transmission line repair device 10 is shown as including first conductor clamp 12 and second conductor line clamp 14. The first and second conductor line clamps are joined together by way of first tie rail 16 and second tie rail 18. The first tie rail 16 is on one side of the first and second conductor clamps, with the second tie rail 18 being positioned on the opposite side of the first and second conductor clamps. In the configuration shown, the tie rails are positioned so that the device 10 is substantially symmetrical and substantially centrally weighted about conductor around which the device will be positioned. Variations, however, are contemplated.

Referring now to FIGS. 2 through 9, the first conductor clamp 12 will be described with the understanding that in the configuration shown, the second conductor clamp 14 is substantially identical (although not required to be substantially identical). The first conductor clamp 12 includes lower assembly 20 and upper assembly 22. As will be described below, the lower assembly and the upper assembly include components which are slidably engageable with each other, through, for example, a tongue and groove configuration.

The lower assembly 20 includes body 30, first side tie railtie rail connector 32a, second side tie railtie rail connector 32b, first side end cap 34a and second side end cap 34b. The body includes first end 36, second end 38, outer surface 40, inner surface 42, first side connector assembly 44 and second side connector assembly 46. The body 30 is preferably formed from an extrusion (which may be later machined). Of course, other formations, including machining, casting or forging are likewise contemplated. In the configuration shown, the body is formed from a metal, such as aluminum (metal or alloy thereof). Of course, other materials are likewise contemplated for use. Typically, such materials are conductive of electricity.

The outer surface 40 generally comprises an outwardly convex surface, such as a semi-circular configuration, although not being limited thereto. The inner surface 42 includes conductor contact region 50 which includes a inwardly concave surface, for example, a semi-circular configuration. The inner surface defines an elongated slot. In some configurations, the outer surface and the inner surface are substantially uniform resulting in a generally uniform thickness of the body 30 along the length thereof. The outer surface configuration which is convex and generally includes rounded corners being substantially free from sharp edges or protruding surfaces is to minimize electrical corona, which typically occurs between 138 kV and 169 kV, depending on the elevation above sea level (due to atmospheric density and pressure issues).

Figure 7:
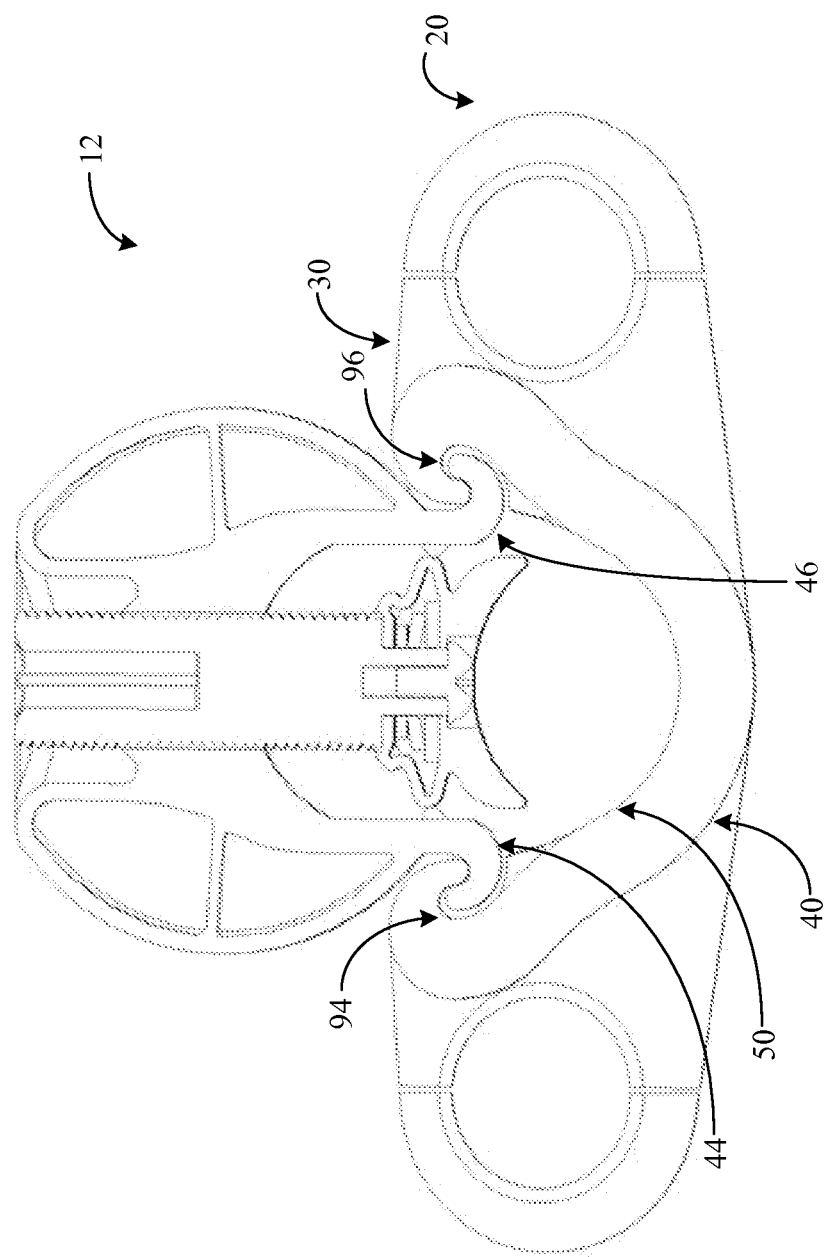
FIG. 7 of the drawings is a cross-sectional view of the first conductor clamp of the present disclosure, showing, in particular, the coupling of the upper assembly and the lower assembly to each other.
Figure 8:
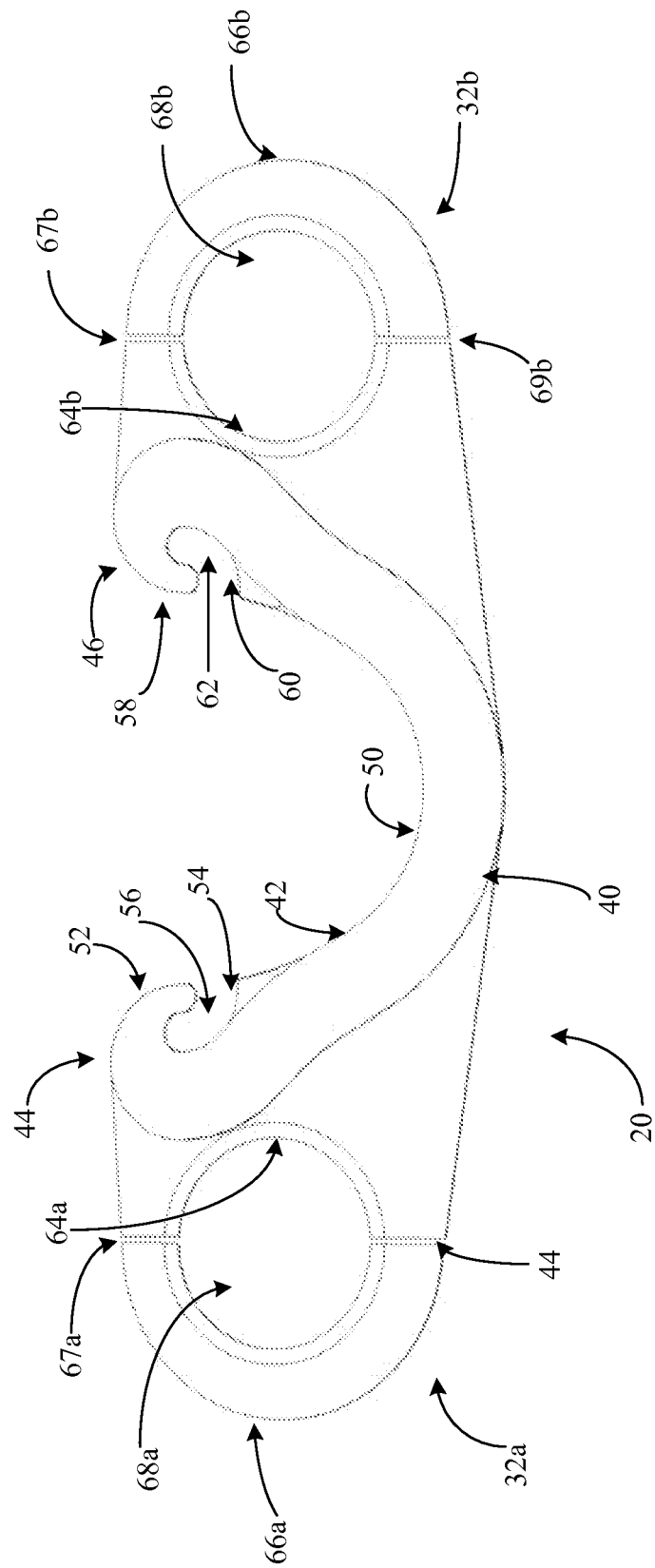
FIG. 8 of the drawings is a cross-sectional view of the lower assembly of the first conductor clamp.
Figure 9:
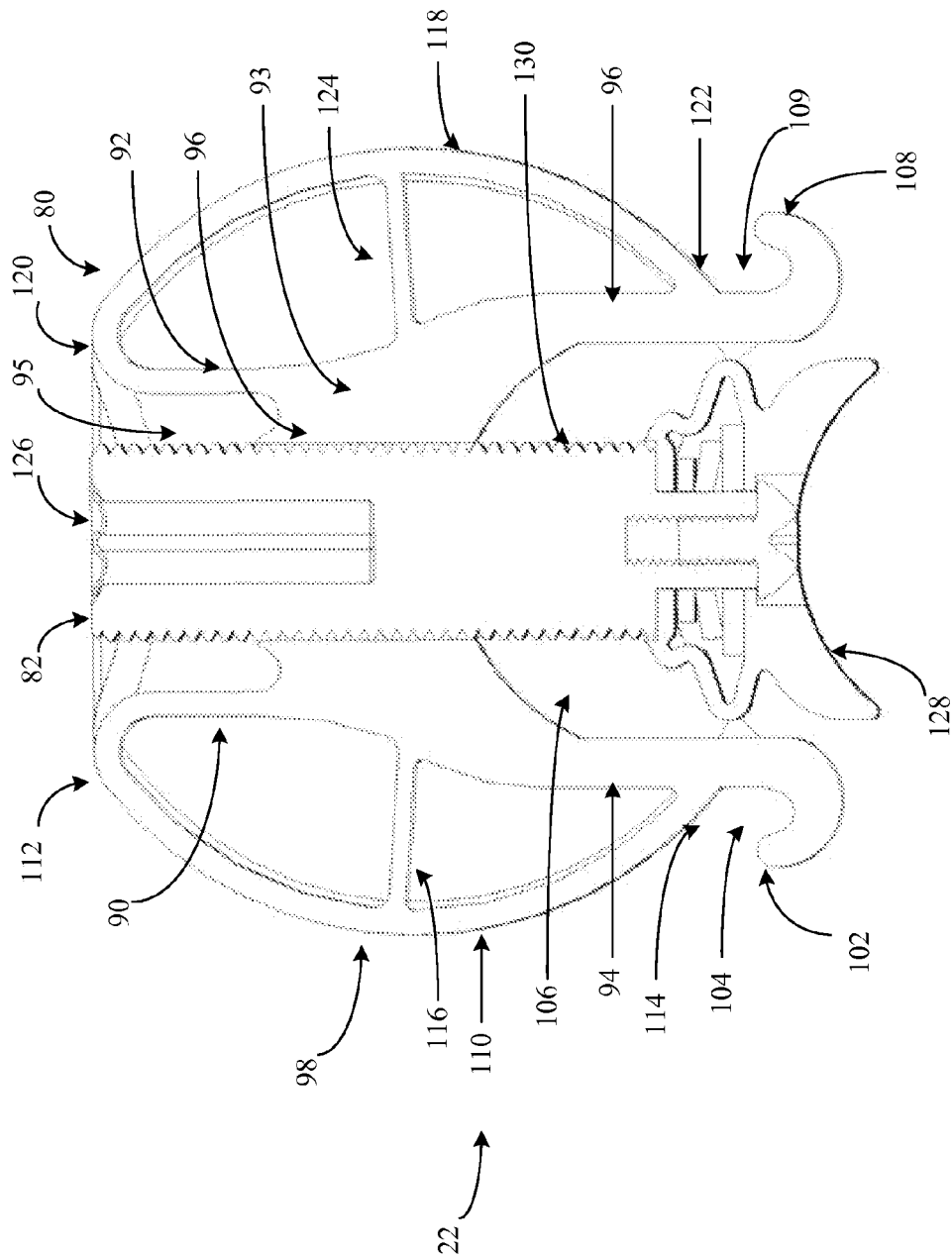
FIG. 9 of the drawings is a cross-sectional view of the upper assembly of the first conductor clamp.
Figure 10:
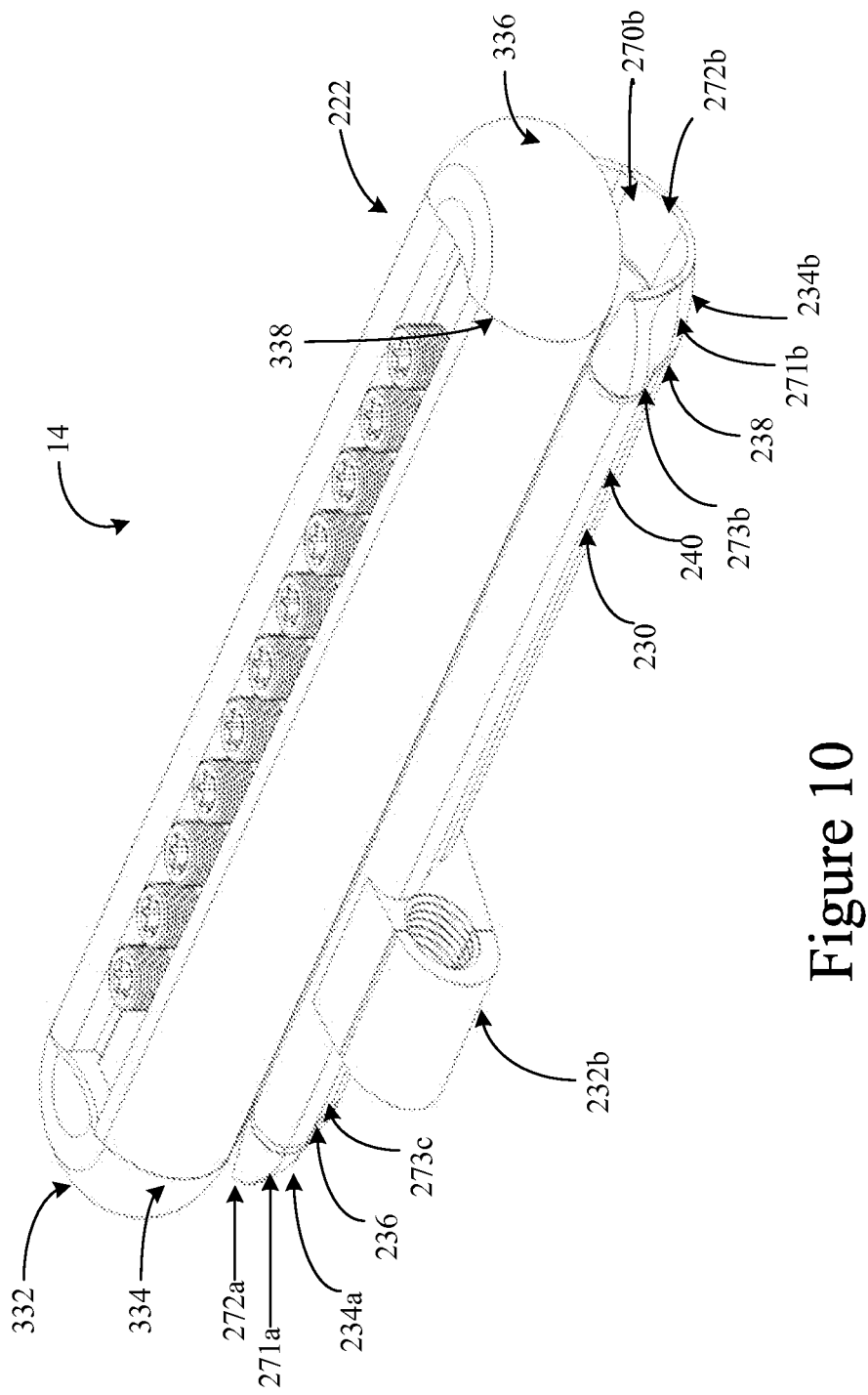
FIG. 10 of the drawings is a perspective view of the second conductor clamp of the present disclosure, showing the first side tie rail connection.
Figure 11:
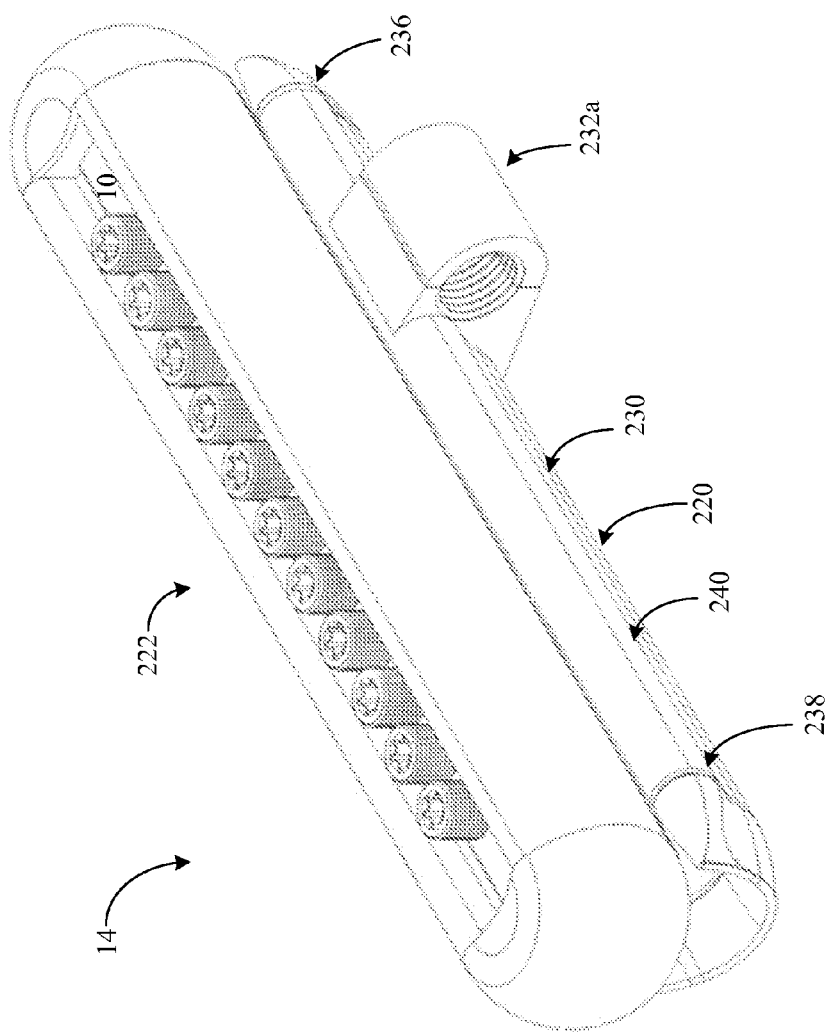
FIG. 11 of the drawings is a perspective view of the second conductor clamp of the present disclosure, showing the second side tie rail connection.
Figure 12:
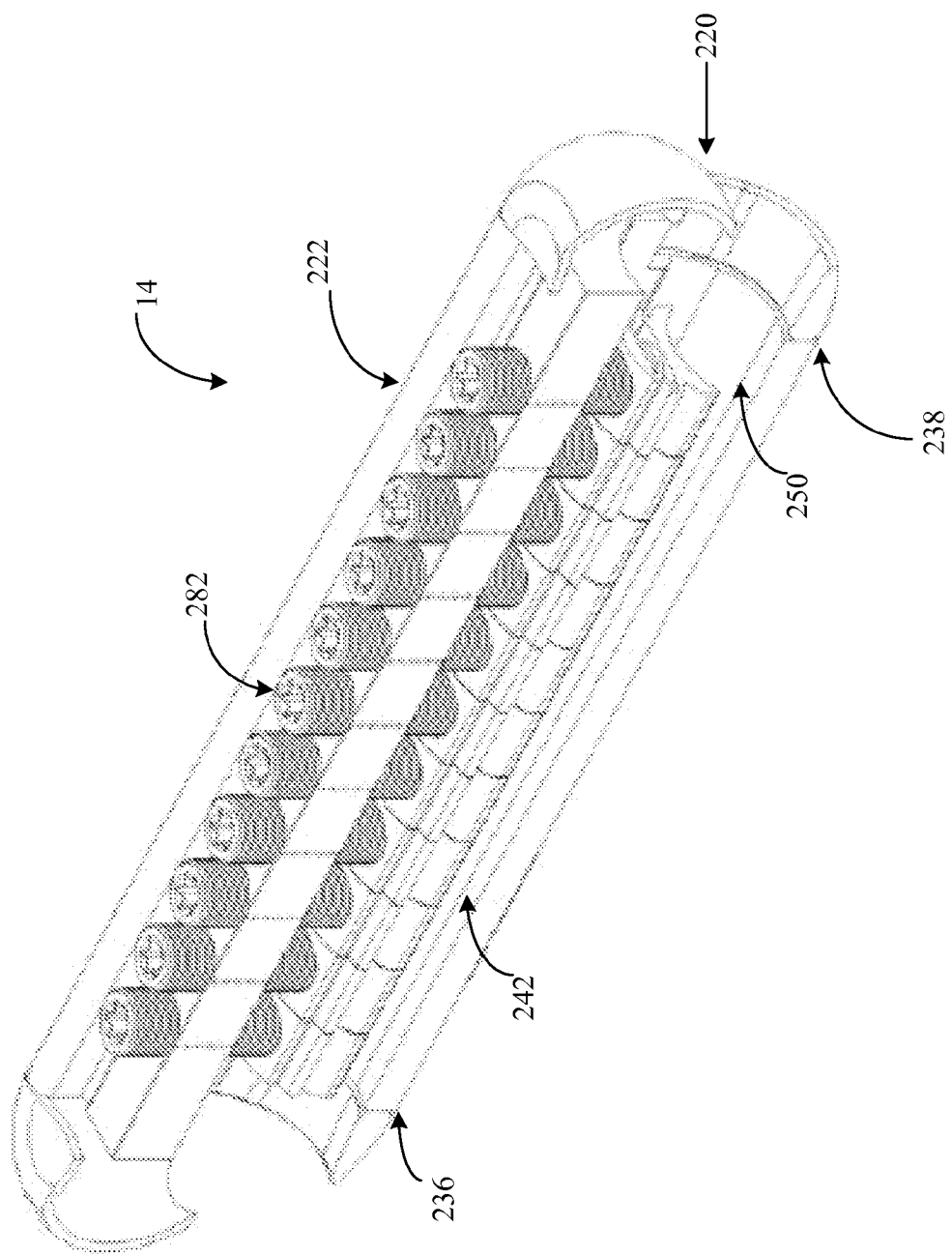
FIG. 12 of the drawings is a longitudinal cross-sectional perspective view of the second conductor clamp of the present disclosure, offset slightly, thereby showing the complete fastener.
Figure 13:
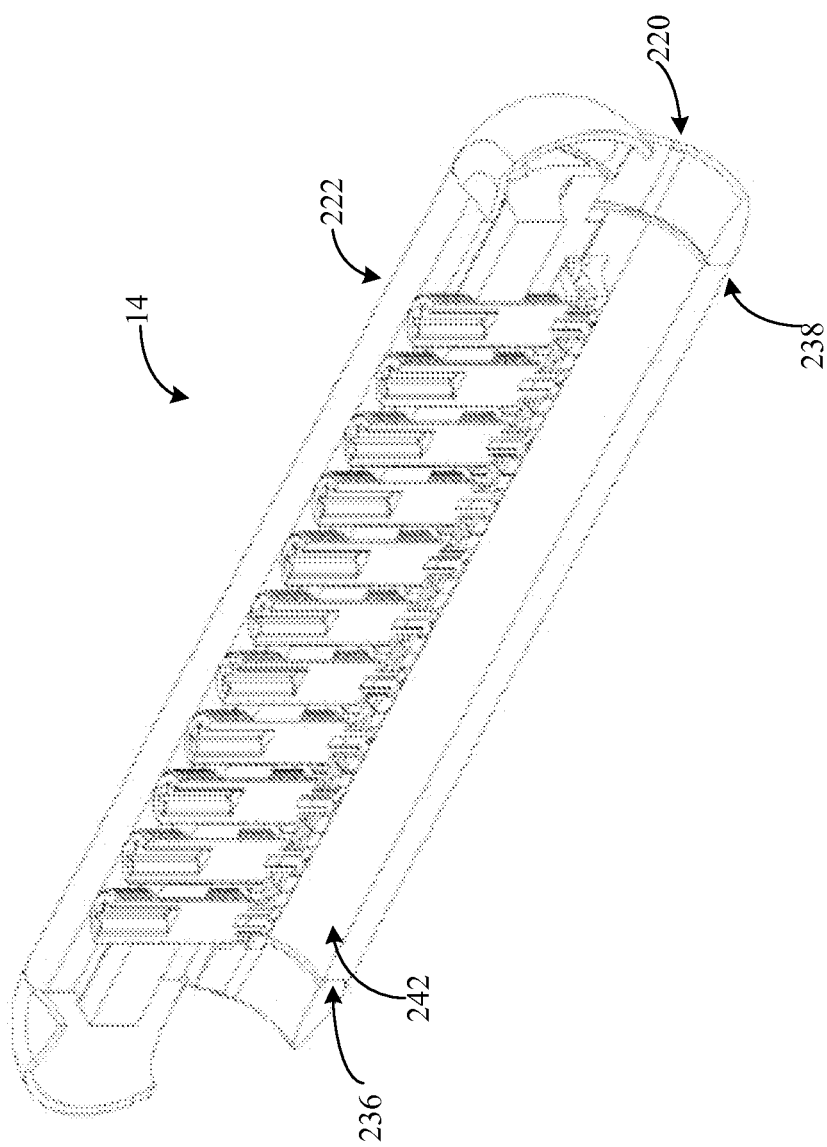
FIG. 13 of the drawings is a longitudinal cross-sectional perspective view of the second conductor clamp of the present disclosure, taken about the longitudinal axis of the conductor clamp.
Figure 14:
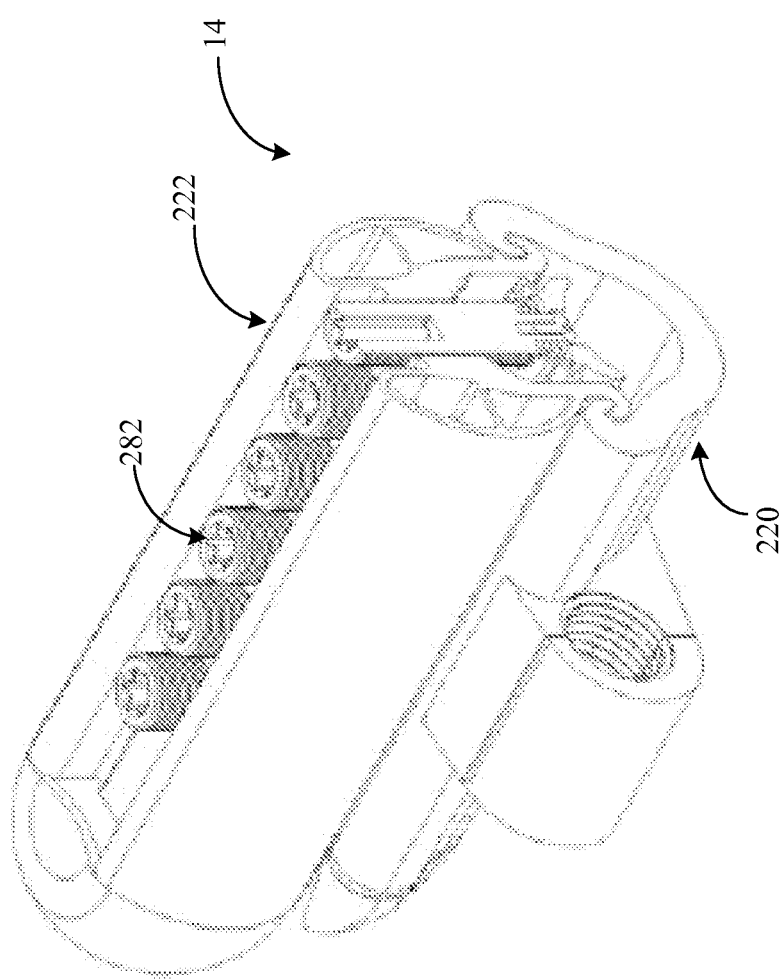
FIG. 14 of the drawings is a transverse cross-sectional perspective view of the second conductor clamp of the present disclosure.
Figure 15:
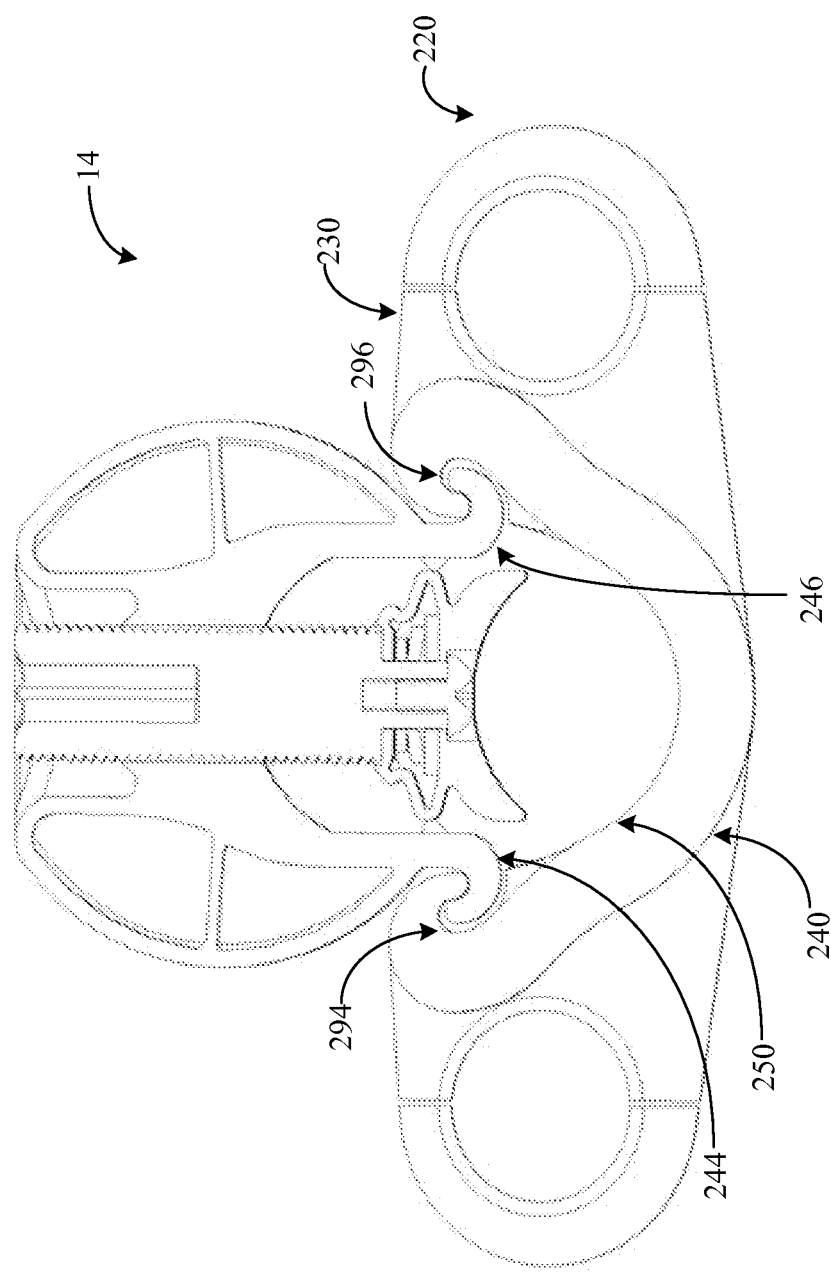
FIG. 15 of the drawings is a cross-sectional view of the second conductor clamp of the present disclosure, showing, in particular, the coupling of the upper assembly and the lower assembly to each other.
Figure 16:
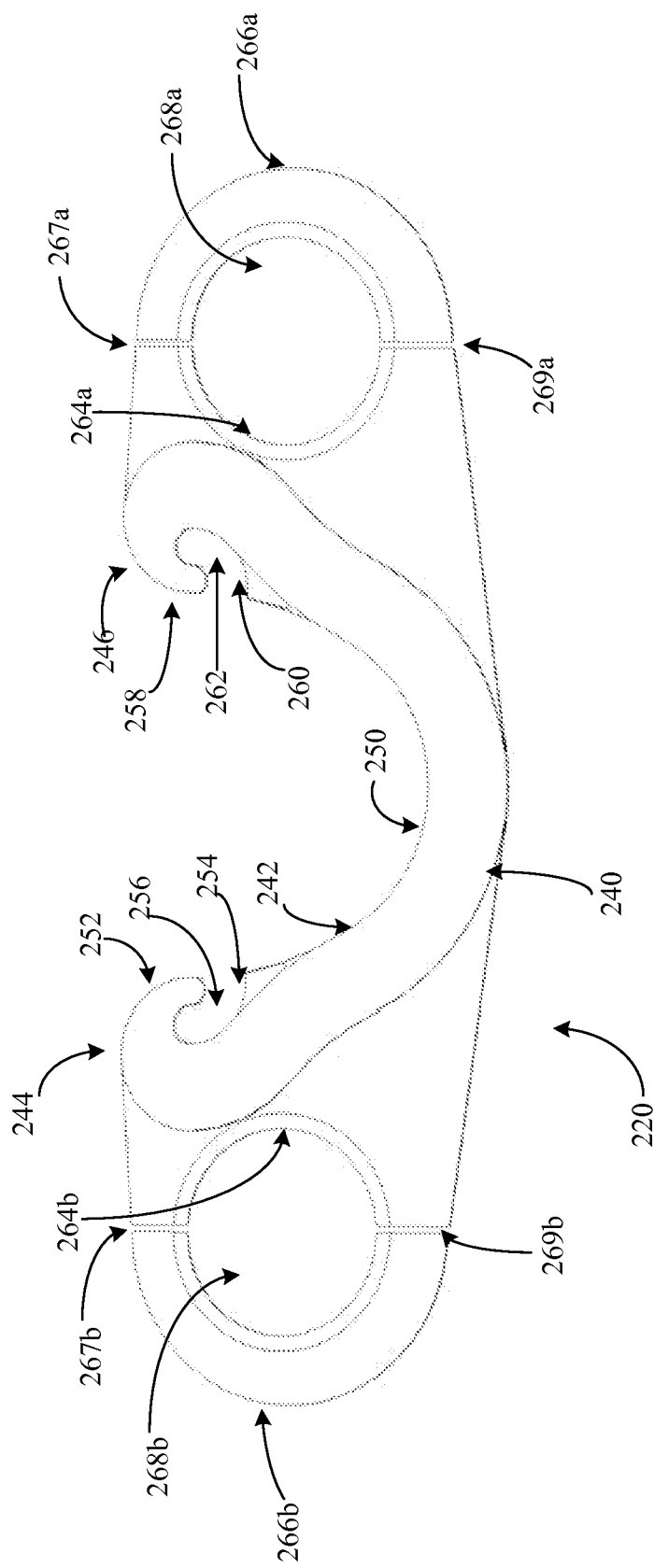
FIG. 16 of the drawings is a cross-sectional view of the lower assembly of the second conductor clamp.

With reference to FIGS. 7-9, the first side connector assembly 44 includes outer lip 52, inner lip 54 and groove 56. The first side connector assembly 44 essentially extends from the outer and inner surfaces with the outer surface being a substantially smooth transition thereto. The outer lip and the inner lip are spaced apart so as to define the groove 56. The structure is substantially uniform along the length of the body 30 (although variations are contemplated). The second side connector assembly 46 is a substantial mirror image of the first side connector assembly taken generally by an axis bisecting the body between the first end and the second end. Of course, variations between the sides are contemplated. The second groove assembly 46 includes outer lip 58, inner lip 60 and groove 62. The opposing groove assemblies generally form the upper ends of the slot defined by the inner surface of the body.

As will be explained below, the first side connector assembly 44 and the second side connector assembly 46 are configured to receive corresponding lower legs of the upper assembly in a tongue and groove configuration, through slidable engagement therebetween.

Referring now to FIG. 8, the first side tie rail connection 32a comprises inner component 64a and outer component 66a. The two components are joined together at upper joint 67a and lower joint 69a, which joining defines inner surface 68a. The inner surface is configured to receive the first tie rail in operable engagement (which will be described below in greater detail). Similarly, the second side tie rail connection 32b is positioned on the opposite side from the first side tie rail connection and includes inner component 64b and outer component 66b. The two components are joined together at upper joint 67b and lower joint 69b, which joining defines the inner surface 68b. The inner surface is configured to receive the second tie rail in operable engagement. In the configuration shown, the first and second leg connections are positioned proximate the second end of the body 30, although more central locations are contemplated as are locations that are closer to the first end of the body 30. In the configuration shown, the first and second leg connections are positioned so as to be mirror images of each other relative to an axis that extends from the first end to the second end of the body, bisecting the body therealong. Additionally, in the configuration shown, the leg connections are configured so that the positioning of the tie rails is centered, generally, with the conductor cable positioned within the conductor contact region.

The first end cap 34a includes upper end 70a, lower end 72a, outer rim 74a and inner joining portion 76a. The first end cap is positioned at the first end 36 of the body 30. The inner joining portion 76a is joined to the first end 36 and substantially matches the configuration thereof. The upper and lower ends 70a, 72a generally round the first end into the desired configuration to minimize electrical corona effects. The outer rim 74a likewise is formed to minimize corona effects. In the configuration shown, the first end cap is welded to the body 30 at the first end. Of course, in other configurations, the two components may be fastened together through screws or other fasteners, interlocking components, and interference fits, for example. In still other configurations, the two components may be formed together (by way of a casting or the like).

The second end cap 34b is substantially identical to the first end cap 34a, with some variation. Specifically, the first end cap 34a includes tapered entrance grooves intended to ease or facilitate the introduction of the upper assembly 22 into the lower assembly 20. The second end cap 34b, serves as a stop, to arrest the forward movement of upper assembly 22 when tension is applied to the conductor. The second end cap includes upper end 70b, lower end 72b, outer rim 74b and inner joining portion 76b. The second end cap is positioned opposite the first end cap at the second end 38 of the body 30. The inner joining portion 76b is joined to the second end 38 and substantially matches the configuration thereof. The upper and lower ends 70b, 72b generally round the second end into the desired configuration to minimize electrical corona effects. The outer rim 74b is formed to minimize corona effects. The manner of joining the second end cap is similar to that of the first end cap. It is contemplated that the first and second end caps may be joined through different means.

The particular configuration of the first and second end caps may be varied depending on a number of factors, including, line specifications, voltages, atmospheric conditions, conductor configuration, installation orientation, among others. The configuration shown is an exemplary configuration with the understanding that the configurations are not limited thereto.

The upper assembly 22 is shown in FIGS. 2-7 and 9 as comprising central body 80, clamping fasteners, such as clamping fastener 82, first upper end cap 84 and second upper end cap 86. The central body 80 is slidably mated with the body 30 of the lower assembly and includes first upper wall 90, second upper wall 92, base wall 93, first lower leg 94, second lower leg 96, first side corona shield 98 and second side corona shield 99. The central body extends from a first end to a second end, and, preferably comprises an extrusion that is machined post extrusion. In other embodiments, the central body may comprise a casting, a forging, may be formed from multiple different members that are attached (fastened, welded, among others) to each other. It will also be understood that the central body is formed of a conductive material, such as aluminum (metal or alloy thereof), although other materials are contemplated for use.

The first upper wall 90 an the second upper wall 92 extend from the base wall 93 and are spaced apart from each other so as to define an upper channel 95. The depth of the channel is such that, preferably, the clamping fasteners 82 can be maintained substantially entirely within the upper channel 95, while being allowed to be accessed and rotated about their axis by hand and/or with a tool. Generally the channel is substantially uniform in cross-sectional configuration, however, variations are contemplated.

A plurality of threaded openings, such as threaded opening 96 are presented along the base wall between the first and second ends thereof, and extend transversely through the base wall and into the lower channel 106. The openings are generally perpendicular to the base wall and generally substantially parallel with the upper walls. The threaded openings are spaced apart from each other at predetermined distances which are generally uniform, while variations are contemplated.

The first lower leg 94 extends in a direction generally opposite of the first upper wall 90 and includes first side tongue 102 and first side accepting region 104 positioned at a distal end thereof. The first side tongue extends outwardly and upwardly defining the first side accepting region 104. The second lower leg 96 extends in a direction generally opposite of the second upper wall 92 and includes second side tongue 108 and second side accepting region 109 positioned at a distal end thereof. The second side tongue extends outwardly and upwardly defining the second side accepting region 109. The first and second lower legs are spaced apart from each other so as to define a lower channel 106 that extends between the first and second ends of the central body 80 of the upper assembly 22.

The lower channel 106 is configured to accept the lower portion of the clamping fastener which is then extended into the conductor contact region 50 of the inner surface of the body 30 of the lower assembly 20. Due to the configuration of the clamping fastener, the lower channel tends to be wider than the upper channel, although in different embodiments, such a relationship may or may not be present.

The first side corona shield 98 is shown in FIG. 9 as comprising outer surface 110, upper end 112, lower end 114 and inner web 116. The outer surface is outwardly convex in surface configuration, and in the configuration shown, comprises a substantially semi-circular configuration. At the upper end 112, the first side corona shield mates with the first upper wall 90 at a distal end thereof. It will be understood that the interface between the first upper wall and the first side corona shield is rounded to preclude sharp corners in the configuration shown. At the lower end 114, the first side corona shield meets the first lower leg inboard of the first side tongue and the first side accepting region. The inner web 116 extends internally from the outer surface to one of the base wall, the first upper wall and the first lower leg to provide enhanced stability and structural support for the outwardly convex shape of the first corona shield.

The second side corona shield 99 is shown in FIG. 9 as being a substantial mirror image of the first side corona shield 98. The second side corona shield 99 includes outer surface 118, upper end 120, lower end 122 and inner web 124. The outer surface is outwardly convex in surface configuration, and in the configuration shown, comprises a substantially semi-circular configuration. A the upper end 120, the second side corona shield mates with the second upper wall 92 at a distal end thereof. It will be understood that the interface between the second upper wall and the second side corona shield is rounded to preclude sharp corners in the configuration shown. At the lower end 122, the second side corona shield meets the second lower leg inboard of the second side tongue and the second side accepting region. The inner web 124 extends internally from the outer surface to one of the base wall, the second upper wall and the second lower leg to provide enhanced stability and structural support for the outwardly convex shape of the second corona shield.

The positioning of the lower end of each of the first side and second side corona shields is such that upon installation, the first and second side groove assemblies are in close proximity with the corona shields. The corona shields may, in some configurations provide additional structural support to the interface between the lower assembly and the upper assembly by way of the body 30 and the central body 80 thereof.

It will be understood that variations in the shape of the corona shields are contemplated, as well as with the inner web or other supporting structure. In certain embodiments, the radius of curvature of the corona shield may be varied, may be smaller or larger than that which is shown. It will also be understood that each corona shield may have a different configuration, and may comprise a number of different arcuate or curved configurations, and that the configuration shown in not to be deemed limiting.

Figure 4:
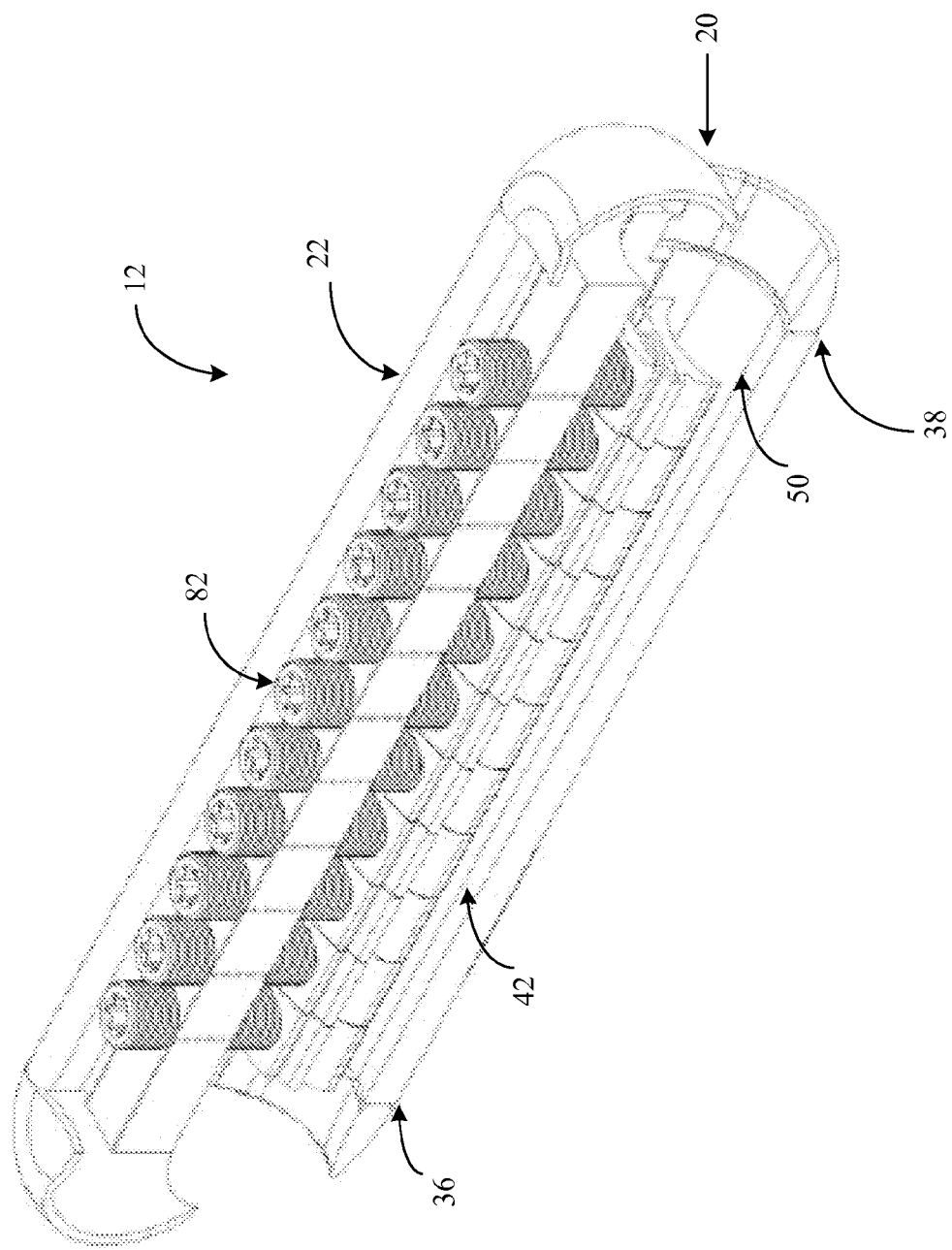
FIG. 4 of the drawings is a longitudinal cross-sectional perspective view of the first conductor clamp of the present disclosure, offset slightly, thereby showing the complete fastener.
Figure 5:
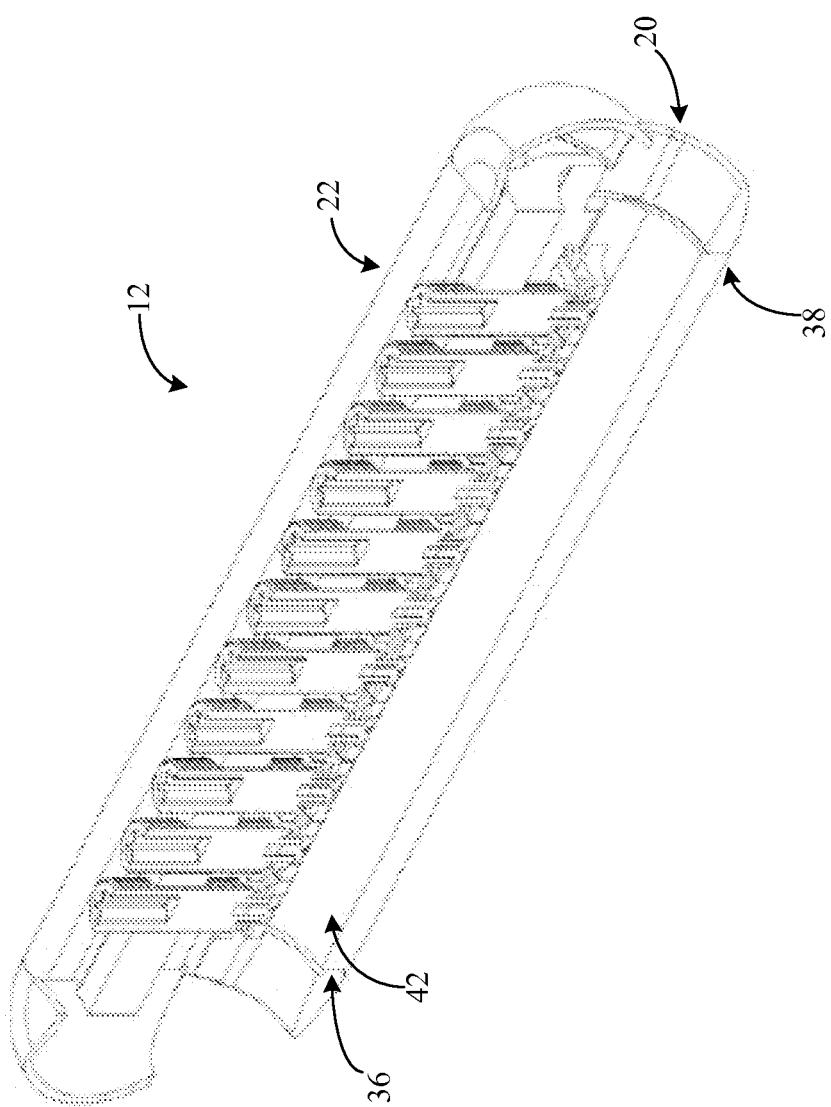
FIG. 5 of the drawings is a longitudinal cross-sectional perspective view of the first conductor clamp of the present disclosure, taken about the longitudinal axis of the conductor clamp.
Figure 6:
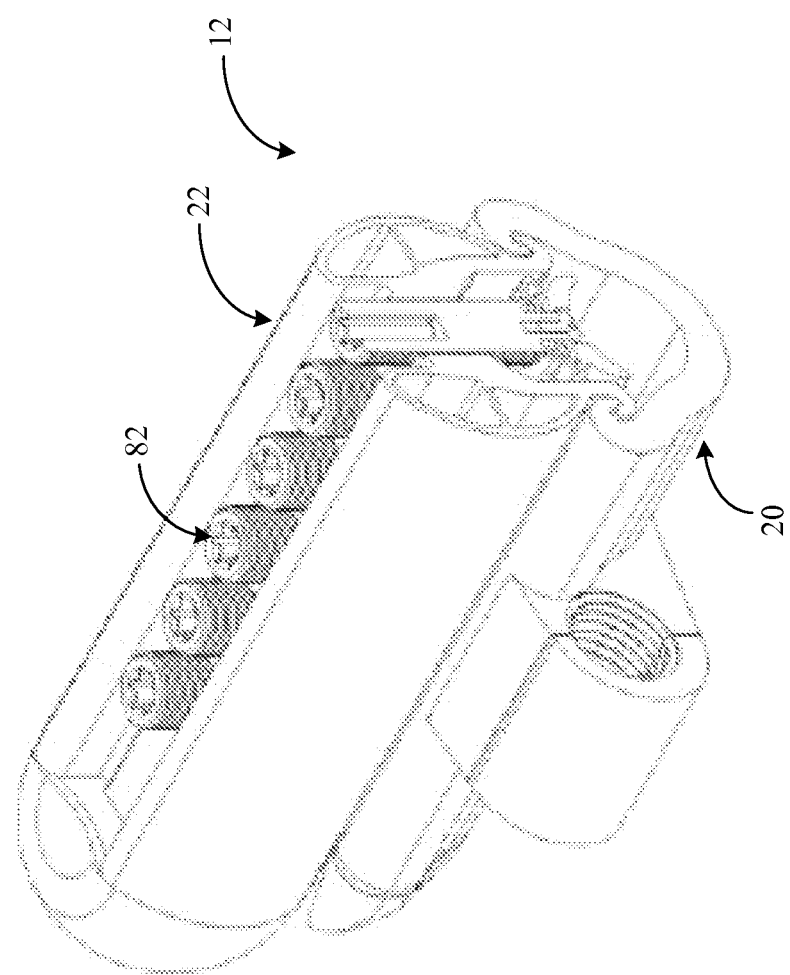
FIG. 6 of the drawings is a transverse cross-sectional perspective view of the first conductor clamp of the present disclosure.

The clamping fastener 82 is shown in FIGS. 4, 7 and 9 as comprising tool engagement end 126, conductor engagement end 128 and outer surface 130. The clamping fastener interfaces with the threaded opening 96, extending therethrough. The tool engagement end is on one side of the threaded opening 96, with the conductor engagement end 128 at the other side of the threaded opening, and positioned within the lower channel. It will be understood that the clamping fastener engages the conductor that is positioned within the conductor contact region 50, and can be forced thereagainst.

A number of different clamping fasteners are contemplated for use. One example of a clamping fastener is shown in co-pending patent application entitled "Fastener For A Connector In An Electrical Coupling" which is assigned to the assignee of the present disclosure. Other such fasteners may comprise the fastener shown in U.S. Pat. No. 7,699,669 B2, entitled "Screw Assembly For Electrical Connectors" issued to Sweeney et al. Of course, other, including conventional fasteners are contemplated for use. Each of the foregoing, that is, the application and the issued patent, are incorporated in their entirety by reference herein.

It is also contemplated that a fastener other than the clamping fastener may be utilized. For example, a fastener such as a wedge type fastener or the like can be inserted between the upper assembly and the conductor to force (under load) the conductor against the conductor contact region 50 of the lower assembly, thereby sandwiching the conductor therebetween. Other configurations are contemplated which do not require a clamping fastener extending through an opening in the upper assembly, but rather a member that works against the conductor and the upper assembly to sandwich the conductor against the conductor contact region 50 or a surface on the lower assembly.

The first end cap 84 includes outer surface 132 and mating face 134. The outer surface comprises a hemispherical shape that generally follows the contours of the outer surface of each of the first and second corona shields. In the configuration shown, the first end cap and the second end cap are substantially identical. As such, the second end cap comprises an outer surface 136 and an mating face 138. In the configuration shown, the first and second cap members are coupled to the central body at opposing ends through welding. In other embodiments, a fastener may couple the cap member to the respective end of the central body. In still other configurations, an interference fit or a locking engagement may be utilized. Of course, combinations of the foregoing are likewise contemplated. It will be understood that the end caps further provide shielding to preclude electrical corona. It will be noted that in the configuration shown, a depression is provided at the upper surface corresponding to the upper channel 95 so as to limit the use of sharp or protruding edges, again toward limiting electrical corona.

The second clamp is shown in FIGS. 10 through 17 as being substantially identical to the first clamp, and positioned so as to be a mirror image thereof about an axis bisecting the assembly substantially perpendicular to the conductor(s) to which the assembly is coupled. Of course, it is contemplated that the two clamps have differing configurations, depending on the application. For example, the second clamp or the first clamp may be a prior art configuration, or a configuration that has a shape that is not identical to that which is shown in the Figures.

In the configuration shown, however, the first and second clamps are substantially identical. As such, the description below of the second clamp utilizes the same reference numbers for like structures augmented by 200. For example, the lower assembly 20 of the first conductor clamp is referred to as the lower assembly 220 of the second conductor clamp.

The second conductor clamp 14 includes lower assembly 220 and upper assembly 222. As will be described below, the lower assembly and the upper assembly include components which are slidably engageable with each other, through, for example, a tongue and groove configuration.

The lower assembly 220 includes body 230, first side tie rail connector 232a, second side tie rail connector 232b, first side end cap 234a and second side end cap 234b. The body includes first end 236, second end 238, outer surface 240, inner surface 242, first side connector assembly 244 and second side connector assembly 246. The body 230 is preferably formed from an extrusion (which may be later machined). Of course, other formations, including machining, casting or forging are likewise contemplated. In the configuration shown, the body is formed from a metal, such as aluminum (metal or alloy thereof). Of course, other materials are likewise contemplated for use. Typically, such materials are conductive of electricity.

The outer surface 240 generally comprises an outwardly convex surface, such as a semi-circular configuration, although not being limited thereto. The inner surface 242 includes conductor contact region 250 which includes a inwardly concave surface, for example, a semi-circular configuration. The inner surface defines an elongated slot. In some configurations, the outer surface and the inner surface are substantially uniform resulting in a generally uniform thickness of the body 230 along the length thereof. The outer surface configuration which is convex and generally includes rounded corners being substantially free from sharp edges or protruding surfaces is to minimize electrical corona, which typically occurs between 138 kV and 169 kV, depending on the elevation above sea level (due to atmospheric density and pressure issues).

The first side connector assembly 244 includes outer lip 252, inner lip 254 and groove 256. The first side connector assembly 244 essentially extends from the outer and inner surfaces with the outer surface being a substantially smooth transition thereto. The outer lip and the inner lip are spaced apart so as to define the groove 256. The structure is substantially uniform along the length of the body 230 (although variations are contemplated). The second side connector assembly 246 is a substantial mirror image of the first side connector assembly taken generally by an axis bisecting the body between the first end and the second end. The second groove assembly 246 includes outer lip 258, inner lip 260 and groove 262. The opposing groove assemblies generally form the upper ends of the slot defined by the inner surface of the body.

As will be explained below, the first side connector assembly 244 and the second side connector assembly 246 are configured to receive corresponding lower legs of the upper assembly in a tongue and groove configuration, through slidable engagement therebetween.

The first side tie rail connection 232a comprises inner component 264a and outer component 266a. The two components are joined together at upper joint 267a and lower joint 269a, which joining defines inner surface 268a. The inner surface is configured to receive the first tie rail in operable engagement (which will be described below in greater detail). Similarly, the second side tie rail connection 232b is positioned on the opposite side from the first side tie rail connection and includes inner component 264b and outer component 266b. The two components are joined together at upper joint 267b and lower joint 269b, which joining defines the inner surface 268b. The inner surface is configured to receive the second tie rail in operable engagement. In the configuration shown, the first and second leg connections are positioned proximate the second end of the body 230, although more central locations are contemplated as are locations that are closer to the first end of the body 230. In the configuration shown, the first and second leg connections are positioned so as to be mirror images of each other relative to an axis that extends from the first end to the second end of the body, bisecting the body therealong. Additionally, in the configuration shown, the leg connections are configured so that the positioning of the tie rails is centered, generally, with the conductor cable positioned within the conductor contact region.

The first end cap 234a includes upper end 270a, lower end 272a, outer rim 274a and inner joining portion 276a. The first end cap is positioned at the first end 36 of the body 230. The inner joining portion 276a is joined to the first end 236 and substantially matches the configuration thereof. The upper and lower ends 270a, 272a generally round the first end into the desired configuration to minimize electrical corona effects. The outer rim 74a likewise is formed to minimize corona effects. In the configuration shown, the first end cap is welded to the body 230 at the first end. Of course, in other configurations, the two components may be fastened together through screws or other fasteners, interlocking components, and interference fits, for example. In still other configurations, the two components may be formed together (by way of a casting or the like).

The second end cap 234b is substantially identical to the first end cap 234a. As such, a single component can be made and utilized for each of the first and second end caps. The second end cap includes upper end 270b, lower end 272b, outer rim 274b and inner joining portion 276b. The second end cap is positioned opposite the first end cap at the second end 238 of the body 230. The inner joining portion 276b is joined to the second end 38 and substantially matches the configuration thereof. The upper and lower ends 270b, 272b generally round the second end into the desired configuration to minimize electrical corona effects. The outer rim 274b is formed to minimize corona effects. The manner of joining the second end cap is similar to that of the first end cap. It is contemplated that the first and second end caps may be joined through different means.

The particular configuration of the first and second end caps may be varied depending on a number of factors, including, line specifications, voltages, atmospheric conditions, conductor configuration, installation orientation, among others. The configuration shown is an exemplary configuration with the understanding that the configurations are not limited thereto.

The upper assembly 222 is shown in FIGS. 10 through 15 and 17 as comprising central body 280, clamping fasteners, such as clamping fastener 282, first upper end cap 284 and second upper end cap 286. The central body 280 is slidably mated with the body 230 of the lower assembly and includes first upper wall 290, second upper wall 292, base wall 293, first lower leg 294, second lower leg 296, first side corona shield 298 and second side corona shield 299. The central body extends from a first end to a second end, and, preferably comprises an extrusion that is machined post extrusion. In other embodiments, the central body may comprise a casting, a forging, may be formed from multiple different members that are attached (fastened, welded, among others) to each other. It will also be understood that the central body is formed of a conductive material, such as aluminum (metal or alloy thereof), although other materials are contemplated for use.

The first upper wall 290 an the second upper wall 292 extend from the base wall 293 and are spaced apart from each other so as to define an upper channel 295. The depth of the channel is such that, preferably, the clamping fasteners 282 can be maintained substantially entirely within the upper channel 295, while being allowed to be accessed and rotated about their axis by hand and/or with a tool. Generally the channel is substantially uniform in cross-sectional configuration, however, variations are contemplated.

A plurality of threaded openings, such as threaded opening 96 are presented along the base wall between the first and second ends thereof, and extend transversely through the base wall and into the lower channel 306. The openings are generally perpendicular to the base wall and generally substantially parallel with the upper walls. The threaded openings are spaced apart from each other at predetermined distances which are generally uniform, while variations are contemplated.

The first lower leg 294 extends in a direction generally opposite of the first upper wall 290 and includes first side tongue 302 and first side accepting region 304 positioned at a distal end thereof. The first side tongue extends outwardly and upwardly defining the first side accepting region 304. The second lower leg 296 extends in a direction generally opposite of the second upper wall 292 and includes second side tongue 308 and second side accepting region 309 positioned at a distal end thereof. The second side tongue extends outwardly and upwardly defining the second side accepting region 309. The first and second lower legs are spaced apart from each other so as to define a lower channel 306 that extends between the first and second ends of the central body 80 of the upper assembly 222.

The lower channel 306 is configured to accept the lower portion of the clamping fastener which is then extended into the conductor contact region 250 of the inner surface of the body 230 of the lower assembly 220. Due to the configuration of the clamping fastener, the lower channel tends to be wider than the upper channel, although in different embodiments, such a relationship may or may not be present.

Figure 17:
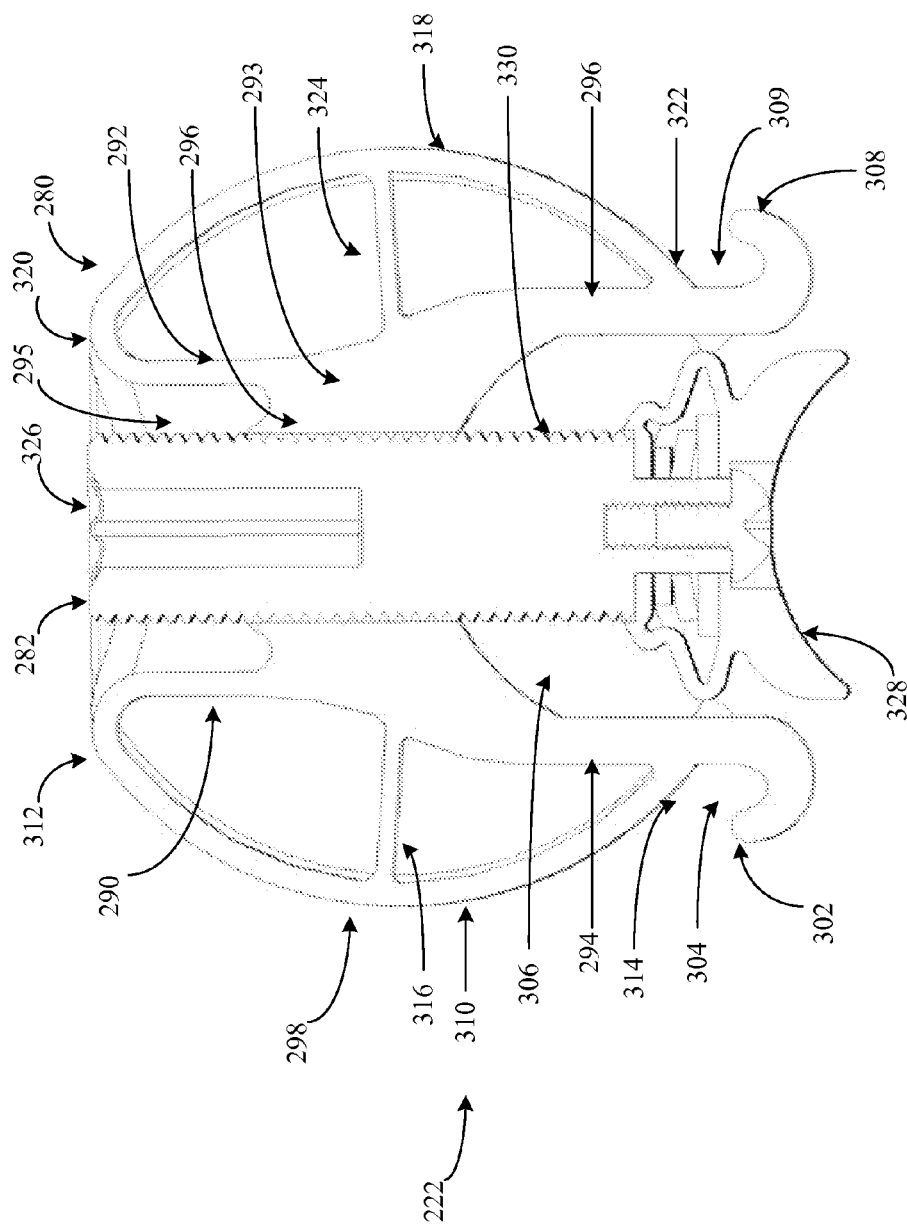
FIG. 17 of the drawings is a cross-sectional view of the upper assembly of the second conductor clamp.

The first side corona shield 298 is shown in FIG. 17 as comprising outer surface 310, upper end 312, lower end 314 and inner web 316. The outer surface is outwardly convex in surface configuration, and in the configuration shown, comprises a substantially semi-circular configuration. At the upper end 312, the first side corona shield mates with the first upper wall 290 at a distal end thereof. It will be understood that the interface between the first upper wall and the first side corona shield is rounded to preclude sharp corners in the configuration shown. At the lower end 314, the first side corona shield meets the first lower leg inboard of the first side tongue and the first side accepting region. The inner web 316 extends internally from the outer surface to one of the base wall, the first upper wall and the first lower leg to provide enhanced stability and structural support for the outwardly convex shape of the first corona shield.

The second side corona shield 299 is shown in FIG. 17 as being a substantial mirror image of the first side corona shield 298. The second side corona shield 299 includes outer surface 318, upper end 320, lower end 322 and inner web 324. The outer surface is outwardly convex in surface configuration, and in the configuration shown, comprises a substantially semi-circular configuration. A the upper end 320, the second side corona shield mates with the second upper wall 292 at a distal end thereof. It will be understood that the interface between the second upper wall and the second side corona shield is rounded to preclude sharp corners in the configuration shown. At the lower end 322, the second side corona shield meets the second lower leg inboard of the second side tongue and the second side accepting region. The inner web 324 extends internally from the outer surface to one of the base wall, the second upper wall and the second lower leg to provide enhanced stability and structural support for the outwardly convex shape of the second corona shield.

The positioning of the lower end of each of the first side and second side corona shields is such that upon installation, the first and second side groove assemblies are in close proximity with the corona shields. The corona shields may, in some configurations provide additional structural support to the interface between the lower assembly and the upper assembly by way of the body 230 and the central body 280 thereof.

It will be understood that variations in the shape of the corona shields are contemplated, as well as with the inner web or other supporting structure. In certain embodiments, the radius of curvature of the corona shield may be varied, may be smaller or larger than that which is shown. It will also be understood that each corona shield may have a different configuration, and may comprise a number of different arcuate or curved configurations, and that the configuration shown in not to be deemed limiting.

The clamping fastener 282 is shown in FIGS. 13 through 15 and 17 as comprising tool engagement end 326, conductor engagement end 328 and outer surface 330. The clamping fastener interfaces with the threaded opening 296, extending therethrough. The tool engagement end is on one side of the threaded opening 296, with the conductor engagement end 328 at the other side of the threaded opening, and positioned within the lower channel. It will be understood that the clamping fastener engages the conductor that is positioned within the conductor contact region 250, and can be forced thereagainst.

The first end cap 284 includes outer surface 332 and mating face 334. The outer surface comprises a hemispherical shape that generally follows the contours of the outer surface of each of the first and second corona shields. In the configuration shown, the first end cap and the second end cap are substantially identical. As such, the second end cap comprises an outer surface 336 and an mating face 338. In the configuration shown, the first and second cap members are coupled to the central body at opposing ends through welding. In other embodiments, a fastener may couple the cap member to the respective end of the central body. In still other configurations, an interference fit or a locking engagement may be utilized. Of course, combinations of the foregoing are likewise contemplated. It will be understood that the end caps further provide shielding to preclude electrical corona. It will be noted that in the configuration shown, a depression is provided at the upper surface corresponding to the upper channel 95 so as to limit the use of sharp or protruding edges, again toward limiting electrical corona.

The first and second tie rails 16, 18, respectively are shown in FIG. 1 as extending between the first conductor clamp 12 and the second conductor clamp 14. The first tie rail 16 includes first end 24 and second end 26. The first end 24 extends through the first side tie rail connection 32*a* of the first conductor clamp 12. The second end 26 extends through the first side tie rail connection 232*a* of the second conductor clamp 14. A number of different methods of attachment are contemplated including a compression fit, welding, the use of fasteners, the use of expansion wedges, individually and in combination.

Similarly, the second tie rail 18 includes first end 224 and second end 226. The first end 224 extends through the second side tie rail connection 32*b* of the first conductor clamp 12. The second end 226 extends through the second side tie rail connection 232*b* of the second conductor clamp 14. As with the first tie rail, a number of attachment methods and structures are contemplated for use.

In the configuration shown, the first and second tie rails comprise conductors which are stranded. For example, the first and second tie rails may comprise a stranded aluminum (metal or alloy thereof) member, which may include a core of a strength member, such as steel, or, a composite, for example, and without limitation. It is contemplated that the first and second tie rails may comprise a different composition depending on the application. It is contemplated that one of the first and second tie rails may omit the use of a conductive material. It is likewise contemplated that in certain embodiments, one of the tie rails may be omitted, or that the tie rails may be coupled together between the first and second conductor clamps. It is also contemplated that in other embodiments, the first and/or second tie rails may comprise a member other than a stranded member, such as, for example, a solid member.

To assemble an electrical transmission repair device, the components are first provided. The lower assembly 30 of the first conductor clamp 14 is provided wherein the end caps are attached to the body 30. The first and second tie rails 16, 18, are interfaced with the respective first and second side tie rail connections 32*a*, 32*b*. The structures are coupled together through various means, as described above. Next, the lower assembly of the second conductor clamp 230 is provided, again with the end caps 234*a*, 234*b* coupled thereto. The second ends of the first and second tie rails 16, 18 are interfaced with the respective first and second side tie rail connections 232*a*, 232*b*. As described above, the structures are coupled together through various means. Once coupled, the first conductor clamp 12 is joined to the second conductor clamp by way of the first and second tie rails.

It will be understood that often a standard length is defined for the first and second tie rails 16, 18. However, it will also be understood that the first and second tie rails may be of varying length, and are not limited to any particular length.

Once joined, the upper assemblies 22, 222 of the respective first and second conductor clamps are prepared. That is, the end caps 84, 86 are attached to the upper assembly 22 at each end thereof. Similarly, the end caps 284, 286 are attached to the upper assembly 222 at each end thereof. It will be understood that the end caps may be coupled by the manufacturer prior to the sending of the device into the field. In other configurations, a user may form the attachment after receiving the components.

The clamping fasteners, such as fastener 82 are inserted through and coupled to the threaded openings 96 of the upper assembly 22. In the configuration shown, the fasteners 82 are inserted from the inside, through lower channel 106 (as the conductor engagement end 128 is larger than the threaded opening whereas the tool engagement end is sized to fit through the threaded openings 96). In the embodiment shown, a total of eleven clamping fasteners are extended through eleven threaded openings. Initially, the clamping fasteners are preferably configured so that the conductor engagement ends 128 are maintained substantially entirely within the lower channel 106. Although the same is not required, such an initial positioning simplifies the attachment process in the field.

Similarly, the clamping fasteners 282 are coupled to the threaded openings 296 of the upper assembly 222 of the second conductor clamp 14. This is accomplished in substantially the same manner as the coupling of the fasteners 82 to the upper assembly 22 first conductor clamp 12.

It will be understood that in other configurations, some of the threaded openings 96 may be free of fasteners extending therethrough. In other configurations, it is contemplated that a greater or lesser number of fasteners and threaded openings may be provided. In addition, while the spacing between the fasteners is shown to be substantially uniform, in other configurations, the spacing may be varied.

As explained above, depending on the configuration, the fasteners may be varied, and may take on a number of different configurations. For example, in some configurations, the fasteners may be configured to be insertable from either or both the upper channel or the lower channel. Such variations may depend on the configuration of the fasteners that are utilized. It will be understood that the fasteners of a number of different types may be utilized in a single conductor clamp, if desired.

With the components assembled into the configurations described above, the device 10 is ready for use. The attachment will be described with the understanding that it is shown in a splice configuration. Of course, a number of different installation locations and environments are contemplated, in addition to the splice configuration. In the installation of the splice configuration, the location of the portion of the conductor that is to be surrounded by the device 10 is identified.

Once identified, the first conductor clamp 12 is positioned to one side of the identified portion of the conductor with the second conductor clamp 14 positioned on the other side thereof. The conductor is placed along the conductor contact region 50 of the lower assembly 20 of the first conductor clamp 12. It will be understood that the configuration is such that the conductor clamps may be oriented so that the fasteners extend above the conductor with the conductor contact region below the conductor, or the opposite, wherein the conductor clamps are oriented so that the fasteners extend below the conductor with the conductor contact region above the conductor. It is also contemplated that any angular displacement is likewise contemplated as the use is not limited to any particular orientation between the conductor and the conductor clamps. Thus, the reference to upper assembly and lower assembly is relative, as the lower assembly may be positioned on top of the conductor with the upper assembly being below the conductor. Once positioned, the user can slidably couple the upper assembly 22 to the lower assembly 20. The slidable coupling is achieved by positioning the first end of the upper assembly proximate the second end of the lower assembly so that the first side connector assembly 44 and the second side connector assembly 46 of the lower assembly 22 matingly engage the first lower leg 94 and the second lower leg 96, respectively. In greater detail, the first side tongue 102 of the first lower leg 94 is insertably coupled to the groove 56 of the first side connector assembly 44 of the lower assembly. Similarly, the second side tongue 108 of the second lower leg 96 is insertably coupled to the groove 62 of the second side connector assembly 46. Once the initial coupling is facilitated, the upper assembly 22 is slid relative to the lower assembly 20 so that the first end of the upper assembly is directed toward the first end of the lower assembly, resulting in an overlying engagement, and the defining of a conductor cavity for the conductor. It is contemplated that structures may be positioned on each of the lower assembly and/or the upper assembly to limit movement or to provide some locking or releasable positioning when the desired overlying engagement orientation is reached. For example, in the configuration shown, the first end cap includes a structure which precludes further slidable movement of the upper assembly relative to the lower assembly when the upper assembly reaches the first end cap.

As explained above, the configuration of the lower and upper assembly coupling is what is commonly referred to as a tongue and groove configuration, or, a slidable engagement structure. What is deemed the tongue can be positioned on either one of the upper and lower assemblies (or both) with the groove being positioned on the other of the upper and lower assemblies (or both). The configuration shown is merely exemplary.

Once the desired relative slidable positioning of the upper and lower assemblies is reached, the clamping fastener, or an initial clamping fastener can be tightened. It will be understood that as the clamping fastener is tightened, the conductor engagement end of the clamping fastener engages the conductor extending therethrough and continued tightening sandwiches the conductor between the conductor contact region 50 of the inner surface of the body of the lower assembly 20 and the conductor engagement end of the clamping fastener. At the initial stage, it may be only desirable to tighten a single clamping fastener sufficiently to limit movement of the device along the conductor. In other configurations, each of the fasteners may be tightened to an initial clamping position sufficient to preclude movement, or to a final desired torque on the clamping fasteners.

The second conductor clamp is coupled to the conductor through generally similar methodology. The lower assembly 220 of the second conductor clamp 14 is directed toward and into contact with the conductor. Due to the positioning of the first conductor clamp and the fastening thereof, the second conductor clamp can be directed toward the conductor, and generally, the conductor will be positioned along the conductor contact region 250 of the lower assembly 220 of the second conductor clamp 14. Once positioned, the user can slidably couple the upper assembly 222 to the lower assembly 220. The slidable coupling is achieved by positioning the first end of the upper assembly proximate the second end of the lower assembly so that the first side connector assembly 244 and the second side connector assembly 246 of the lower assembly 222 matingly engage the first lower leg 294 and the second lower leg 296, respectively. In greater detail, the first side tongue 302 of the first lower leg 294 is insertably coupled to the groove 256 of the first side connector assembly 244 of the lower assembly. Similarly, the second side tongue 308 of the second lower leg 296 is insertably coupled to the groove 262 of the second side connector assembly 246. Once the initial coupling is facilitated, the upper assembly 222 is slid relative to the lower assembly 220 so that the first end of the upper assembly is directed toward the first end of the lower assembly, resulting in an overlying engagement, and the defining of a conductor cavity. As with the first conductor clamp, in the configuration shown, the first end cap includes a structure which precludes further slidable movement of the upper assembly relative to the lower assembly when the upper assembly reaches the first end cap.

Also as explained above, the configuration of the lower and upper assembly coupling is what is commonly referred to as a tongue and groove configuration, or, a slidable engagement structure. What is deemed the tongue can be positioned on either one of the upper and lower assemblies (or both) with the groove being positioned on the other of the upper and lower assemblies (or both). The configuration shown is merely exemplary.

Once the desired relative slidable positioning of the upper and lower assemblies is reached, the clamping fastener, or an initial clamping fastener can be tightened. It will be understood that as the clamping fastener is tightened, the conductor engagement end of the clamping fastener engages the conductor extending therethrough and continued tightening sandwiches the conductor between the conductor contact region 250 of the inner surface of the body of the lower assembly 220 and the conductor engagement end of the clamping fastener. At the initial stage, it may be only desirable to tighten a single clamping fastener sufficiently to limit movement of the device along the conductor. In other configurations, each of the fasteners may be tightened to an initial clamping position sufficient to preclude movement, or to a final desired torque on the clamping fasteners.

Once both of the first conductor clamp and the second conductor clamp have been positioned, where the clamping fasteners have not been fully tightened, the user can double check the final position of the first and second conductor clamps. When the position is determined to be accurate (or when the assembly is moved to the desired position), the user can tighten each of the clamping fasteners. As set forth above, it is desirable that the tool engagement ends of the clamping fasteners when fully tightened into the operable position remain substantially entirely, or entirely within the upper channel 95. Once fully tightened, the installation of the device is complete.

Advantageously, the fully assembled device includes corona shielding and additional shielding is not required. Thus, a slidable coupling between the lower assembly and the upper assembly of each of the conductor clamps is required along with the tightening of the fasteners to achieve both the clamping force needed and any shielding that is necessary. In addition, it will be understood that, advantageously, the clamping fasteners are directed straight against the conductor, with the first and second side slidable couplings forming opposing structural balancing forces. As a result, the assembly is generally free of rotational forces and torques applied onto the conductor; rather, the force imparted by the clamping fastener is direct onto the conductor. Such a configuration allows for improved strength and coupling of the conductor, in addition to allowing for a reduction in weight of the device to achieve the same performance a prior art configurations. In addition, such a configuration allows for improved assembly due to the limited movement of the different components and the balanced clamps about the conductor. The foregoing are merely certain advantages of the device of the present disclosure, and are not to be deemed the sole advantages or advantages required by each configuration.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An electrical transmission line repair device comprising:
   a first conductor clamp and a second conductor clamp spaced apart from the first conductor clamp, at least one of the first conductor clamp and the second conductor clamp further including:
      a lower assembly including a conductor contact region extending in a longitudinal direction therealong with a first side connector assembly extending along a first side of the conductor contact region and a second side connector assembly extending along a second side of the conductor contact region so as to position the conductor contact region therebetween;
      an upper assembly including a base wall with a first lower leg extending along a first side of the base wall and a second lower leg extending along a second side of the base wall spaced apart from the first lower leg to define a lower channel therebetween;
      the first side connector configured to longitudinally slidably engage with the first lower leg with the second side connector configured to longitudinally slidably engage the second lower leg to, in turn, slidably couple the lower assembly with the upper assembly through slidable engagement in the longitudinal direction along either side of the conductor contact region to define a conductor cavity therealong; and
      at least one fastener positionable between the base wall and the conductor contact region of the lower assembly, the fastener configured to be directable-toward and away from the conductor contact region of the lower assembly, to, in turn, sandwich a conductor therebetween;
   at least one tie rail connected to the first conductor clamp and to the second conductor clamp.

2. The electrical transmission line repair device of claim 1 wherein the at least one tie rail comprises a first tie rail and a second tie rail, the first tie rail extending between the first conductor clamp and the second conductor clamp on a first side and the second tie rail extending between the first conductor clamp and the second conductor clamp on a second side opposite the first side of the conductor clamps.

3. The electrical transmission line repair device of claim 1 wherein the upper assembly and the lower assembly are substantially symmetrical about a longitudinal axis bisecting the conductor contact region.

4. The electrical transmission line repair device of claim 1 wherein the at least one fastener further comprises at least one clamping fastener configured to extend through at least one opening extending through the base wall, and into the lower channel, the at least one fastener including a conductor engagement end.

5. The electrical transmission line repair device of claim 4 wherein the upper assembly further comprises a plurality of spaced apart openings extending through the base wall, with a clamping fastener positioned in at least a plurality of the plurality of openings, with each of the plurality of fasteners are directed toward and away from the conductor contact region in a manner that is generally perpendicular to a longitudinal axis of the conductor contact region.

6. The electrical transmission line repair device of claim 5 wherein the conductor engagement end is structurally configured to be positionable fully within the lower channel.

7. The electrical transmission line repair device of claim 1 wherein the first side connector assembly further comprises a first side groove and the second side connector assembly further comprises a second side groove, and wherein the first lower leg of the upper assembly further includes a first side tongue and the second lower leg of the upper assembly further includes a second side tongue, wherein the first side groove interfaces with the first side tongue and the second side groove interfaces with the second side tongue.

8. The electrical transmission line repair device of claim 7 wherein the first side groove and the first side tongue are symmetrical with the second side groove and the second side tongue.

9. The electrical transmission line repair device of claim 4 wherein the upper assembly includes a first upper wall extending in a direction away from the base wall on a side of the first lower leg, and a second upper wall extending in a direction away from the base wall on a side of the second lower leg, the first and second upper walls being spaced apart with the at least one opening extending therebetween, the first and second upper walls defining an upper channel therebetween extending therealong.

10. The electrical transmission line repair device of claim 9 wherein the clamping fastener, upon clamping of a conductor therebetween, is structurally configured to remain within the upper channel.

11. The electrical transmission line repair device of claim 10 wherein the upper assembly further includes a first side corona shield defining an outwardly convex configuration having an upper end meeting the first upper wall and a lower end mating with the first lower leg, and a second side corona shield defining an outwardly convex configuration having an upper end meeting the second upper wall and a lower end mating with the second lower leg.

12. The electrical transmission line repair device of claim 11 wherein the outwardly convex configuration of the first and the second side corona shields comprises a semi-circular configuration.

13. The electrical transmission line repair device of claim 11 wherein the first and second side corona shields are integrally formed with the upper assembly.

14. The electrical transmission line repair device of claim 11 further comprising a first end cap extending from a first end of a central body of the upper assembly and a second end cap extending from a second end of the central body of the upper assembly.

15. The electrical transmission line repair device of claim 14 wherein the first and second end caps are substantially hemispherical.

16. The electrical transmission line repair device of claim 1 wherein the lower assembly includes a body formed from an extrusion.

17. The electrical transmission line repair device of claim 16 wherein the upper assembly includes a body formed from an extrusion.

18. The electrical transmission line repair device of claim 1 wherein the second conductor clamp is substantially identical to the first conductor clamp.

* * * * *